(12) United States Patent
Marijnissen et al.

(10) Patent No.: US 7,210,732 B2
(45) Date of Patent: May 1, 2007

(54) ENERGY ABSORBING VEHICLE FENDER

(75) Inventors: Kees Marijnissen, Oosterhout (NL); Roy Gilsing, Rotterdam (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 11/273,194

(22) Filed: Nov. 14, 2005

(65) Prior Publication Data

US 2006/0125289 A1    Jun. 15, 2006

Related U.S. Application Data

(63) Continuation-in-part of application No. PCT/US04/29279, filed on Sep. 3, 2004.

(60) Provisional application No. 60/500,633, filed on Sep. 5, 2003.

(51) Int. Cl.
*B62D 25/16*  (2006.01)

(52) U.S. Cl. ............ 296/198; 296/187.03; 296/187.09; 296/193.09; 296/193.11; 296/203.03

(58) Field of Classification Search ........... 296/187.01, 296/187.03, 187.09, 187.1, 187.12, 193.01, 296/193.09, 193.11, 198, 203.02
See application file for complete search history.

(56) References Cited

U.S. PATENT DOCUMENTS

| 5,171,058 | A  | * | 12/1992 | Ishikawa | ............... | 296/187.12 |
| 6,547,316 | B2 | * |  4/2003 | Chung    | .................. | 296/187.03 |
| 6,612,644 | B2 | * |  9/2003 | Ahn      | ....................... | 296/187.04 |
| 6,676,197 | B2 | * |  1/2004 | Ozawa    | .................. | 296/187.03 |
| 2003/0052517 | A1 | * | 3/2003 | Nakata  | ....................... | 296/194 |
| 2003/0173802 | A1 | * | 9/2003 | Kubota  | .................. | 296/203.02 |

\* cited by examiner

*Primary Examiner*—Lori L. Coletta

(57) ABSTRACT

A fender for absorbing forces generated from an impact includes a depending attachment flange which comprises a vertically aligned section depending from an exterior portion of the fender and a horizontally aligned section depending from the vertically aligned section adapted for mounting to a vehicle wherein the vertically aligned section includes a plurality of contoured portions for enhancing the stiffness of the vertically aligned section.

12 Claims, 5 Drawing Sheets

ENERGY ABSORBING VEHICLE FENDER

CROSS REFERENCE TO RELATED APPLICATIONS

This application is a continuation in part of U.S. patent application PCT/US04/29279 and claims rights of priority under 35 U.S.C. 19 from U.S. patent application Ser. No. PCT/US04/29279 filed on Sep. 3, 2004 and U.S. Provisional Application Ser. No. 60/500633 filed on Sep. 5, 2003, which are incorporated herein by reference in its entirety.

FIELD OF INVENTION

The invention relates to a vehicle fender of the type that is adaptable for pedestrian protection.

BACKGROUND OF THE INVENTION

Future legislation in Japan and European countries may require an energy absorbent design for vehicle fender systems to help protect a pedestrian's head and body from impact with an automotive fender.

Typically, a metal fender is attached to the body of vehicle through a rigid support member sometimes referred to as a shotgun or apron panel. This rigid member, which extends lengthwise of the vehicle, is typically connected to the frame of the automobile and forms a horizontally disposed apron just under the hood for attachment of the fender. A pair of rigid members is positioned on either side of the forward or engine compartment for attachment to respective fenders. An L-shaped flange, which is formed as part of the fender, projects into the interior of the forward compartment and is attached to the apron of the rigid member. U.S. Pat. No. 6,547,316 to Chung describes a fender panel having impact absorption utilizing a bent part located under the hood which is attached between the flange of the fender and the apron of the support member. U.S. Pat. No. 6,554,341 to Lee relates to an impact absorption where the part between the flange of the fender and apron includes a pair of legs extending outwardly and downwardly from the fender flange to the apron of the support member. The '316 patent indicates the intermediate bent part provides for the energy absorption in the event of a crash to a walker to decrease the degree of his or her injury.

The solutions for pedestrian protection set forth in the above patents rely on increasing the distance between the flange of the fender and the rigid support member and inserting a separate, relatively weak structure, between the flange of the fender and the rigid support member. The separate weak structure is deformable under a relatively low force to enhance pedestrian protection. Publications No.: US2002/0060474A1 and US2003/0015890A1 are primarily directed to metal fenders which are inherently very stiff.

SUMMARY OF INVENTION

Typical fenders have a relatively short distance between the upped edge of the fender and attachment of the flange to the rigid support member or so-called shotgun. In order to comply with upcoming pedestrian safety requirements, in particular, proposed head impact requirements, this area of the vehicle presents a problem. In order to comply with these requirements, the structure of the fender and the support of the fender are desirable altered so that an intrusion space is created so that deceleration of an object upon impact with the fender remains relatively low so that the forces of impact are reduced.

According to an embodiment, the intrusion distance for a plastic fender is desirably increased by lowering the position of the rigid support member or shotgun. According to an embodiment, the dimensional stability of the fender is retained while providing for a desirable crushing of the fender upon impact. The reaction of the fender to an intrusion force is desirably provided at the proper level so as to absorb the impact energy force in the available crush distance. According to an embodiment, an integrated solution is incorporated into a thermoplastic fender that is adaptable for pedestrian safety. According to an embodiment, the crushable features of the fender require no additional parts and no secondary operations.

According to an embodiment, the attachment flange has a vertically aligned section that can be tuned to reduce the forces of impact from a top frontal position when crushed by an object but is provided with sufficient stiffness in the other directions to provide dimensional stability.

According to an embodiment, there is provided a fender of the type being adapted to mate with a hood wherein said fender includes an exteriorly facing portion having an aesthetic exterior surface, and recess portion extending away from the aesthetic exterior for the seating of said hood when said hood is in a closed position, said fender being adapted for attachment to a vehicle for absorbing forces generated from an impact, said fender comprising an attachment flange depending from said recess portion wherein said fender and said attachment flange comprise a single integral unit of molded thermoplastic materials, said attachment flange comprising a vertically aligned section and a horizontally aligned section depending from said vertically aligned section and being joined at a juncture, said horizontally aligned section being adapted for mounting to said vehicle, said vertically aligned section including a plurality of contoured portions to provide for stiffening and resist forces in a lateral direction to said vertically aligned section.

Variations are set forth herein and it is contemplated that multiple design features of different shapes can be integrated into the vertically aligned section of the attachment flange so that a desired and sufficient stability may be obtained.

DETAILED DESCRIPTION OF THE INVENTION

Figure 1:
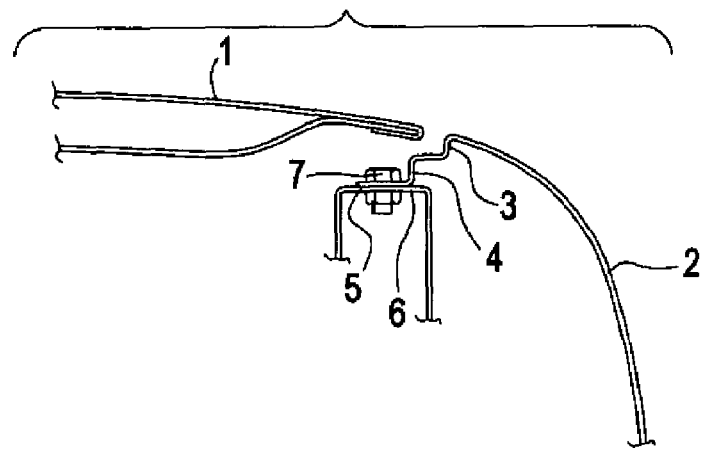
FIG. 1 is a schematic side view showing a fender configuration of the prior art.

FIG. 1 shows partial cross sectional view of a typical prior art mounting of a metal fender 2, which is fixedly secured to support member 6 with a nut and bolt shown at 7. A hood is shown at reference number 1. The fender 2 includes a flanged portion having a vertically depending section 4 joined to a horizontally aligned section 5. A recess portion 3 extends downwardly into the forward compartment from the exterior surface and provides for the seating of the hood 1 when the hood is in a closed position. The recess portion 3 includes an exterior rim at its junction with the exterior portion of the fender 2. As illustrated in FIG. 1, the height of vertically depending section 4 is relatively short so that the distance between the top of fender 2 and the rigid support member 6 is a relatively short distance so that very little space is provided for intrusion of an object during impact before the rigid support member 6 is contacted.

Figure 2:
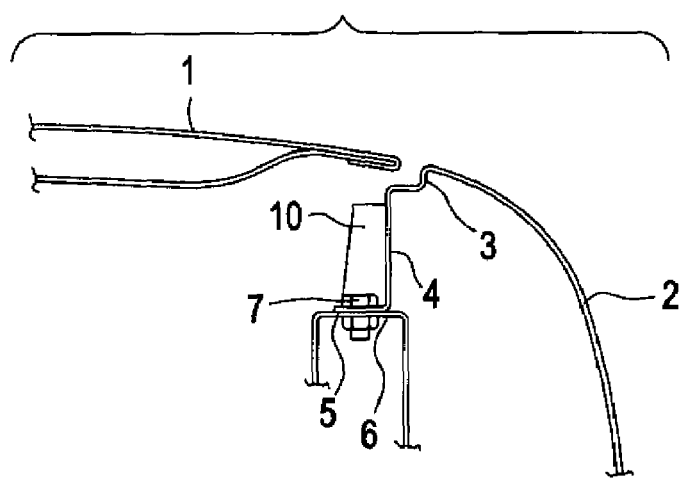
FIG. 2 is a schematic side view showing an embodiment of a fender configuration.

FIG. 2 illustrates an embodiment where the height of the vertically aligned section 4 of the attachment flange is sufficient to permit the fender 2 to crush upon impact while providing for clearance of support member 6 from the intruding object. The fender 2 includes an exteriorly facing portion having an aesthetic exterior surface. A recess portion 3 extends downwardly into the forward compartment from the exterior surface and provides for the seating of the hood 1 when the hood is in a closed position. The recess portion 3 includes an exterior rim at its junction with the exterior portion of the fender 2. An attachment flange portion of the fender 2 is fixedly mounted to a support member 6, which typically provides for a rigid mounting of the fender 2. The support member 6 is known in the art as a shotgun and is typically of metal construction and is mounted to the frame of the vehicle. The flange portion includes a vertically aligned section 4, which joins the recess portion 3 along an interior rim, and a horizontally aligned section 5, which extends toward the interior of the forward compartment adjacent the support member 6 for attachment thereto. The vertically aligned section 4 is joined to the horizontally aligned section 5 at a juncture to form the attachment flange (4, 5). The horizontally aligned section 5 of the flange is secured to a matching horizontally aligned surface of the support member 6. As shown in the drawings fasteners 7 in the form of bolts pass through openings 8 in the horizontally aligned section 5 of the flange and through holes in the apron or horizontally aligned portion of the support member 6. The attachment flange or flanged portion as generally referred to in this specification includes the vertically aligned section 4 and the horizontally aligned section 5.

According to an embodiment, the fender is a plastic material. Typical plastic materials include engineering thermoplastics. Typical thermoplastic resins include, but are not limited thereto, polycarbonates, copolyester carbonates, polyphenylene ethers, polyurethanes, polyethylenes (high and low density) polypropylenes, elastomeric thermoplastics, and the like, and blends thereof with other polymers such as polycarbonate/polybutylene terephthalate, polyphenylene ether/high impact polystyrene, polycarbonate/acrycnitrile-butadiene-styrene, and the like, and blends of the above polymers. One thermoplastic resin is a polycarbonate/polybutylene terephthalate combination sold by General Electric Company under the trademark XENOY® resin. A preferred thermoplastic resin is a polyphenylene ether blend with polyamide sold by General Electric Company under the name NORYL GTX® resin. Fillers including fibers such as glass and nano type composites including nanotubes may also be employed with the thermoplastic used herein.

Desirably the entire fender 2, including the recess portion 3 for seating the hood and the attachment flange, (4, 5) which secures the fender 2 to the vehicle support member 6, are formed as a unitary part from a thermoplastic material. The vertically aligned section 4 of the attachment flange (4, 5), which provides support for the exterior portion of the fender 2, is adapted to crush upon a predetermined impact while providing dimensional stability for the fender 2 during normal use. The vertically aligned section 4 has sufficient height or crush distance to crushably absorb an impact without the rigid support member 6 being forcibly impacted. As shown in FIG. 1, the vertically aligned section 4 of the flange forms a wall extending between the interior rim of the recess 3 and the horizontally aligned section 5 of the attachment flange (4,5). The wall has a contoured shape to provide for stiffening so as to resist forces in a direction substantially normal to the wall. The contoured shape comprises variations in the form of protuberances or indentations, which are desirably connected to or adjacent, the horizontally aligned flange portion to provide stiffness to resist forces in the lateral direction. Preferable the contoured portion or variations 10 merge with both the vertically aligned flange section 4 and the horizontally aligned flange section 5. According to a preferred embodiment, the plurality of contoured portions or variations 10 are spaced a predetermined distance below the rim of the recess 3. With this configuration, the vertically aligned section is more prone to crush adjacent recess 3. In a preferred configuration, the contoured portion 10 acts to stiffen the flange and is in the form of a protuberance, which extends between the horizontal section of the flange and the vertically aligned section 4 of the flange. In a preferred embodiment a plurality of stiffing portions are provided along the length of the vertical section or wall.

The vertical height of the vertically aligned section 4 of the flange may vary from vehicle to vehicle and is preferable equal to or greater than about 60 millimeters (mm). Preferable the height of the vertically aligned section 4 is from about 60 to about 100 millimeters. Heights on the order of 80 are typically in accordance with the present invention. Preferably at least a portion of the contoured portion or variation 10 extends over about two-thirds of the height of the vertically aligned section 4 of the flange. Preferable the contoured portion or variation 10 extends upwardly from the horizontally aligned section 5 of the flange. As described above, the contoured portion 10 preferable merges with the vertically and horizontally aligned sections, 4 and 5, so as to strengthen the joint or junction of the respective sections 4 and 5.

During an impact, the crushable wall desirably deforms to absorb the energy of impact. The energy absorption efficiency of the variations is adaptable for obtaining the desired stiffness for dimensional stability and reducing the forces of impact. The impact response of the vertically aligned section 4 may be tuned for a specific vehicle by the use of materials of different density, of different thickness, and geometry. According to various embodiments, energy from an impact may be controlled by the shape of the contoured portion, by the number of variations, by the height of the variation as measured from the horizontal flange, by the width of the variation, by the depth of the variation, by providing openings in the vertical aligned section 4 of the flange, by providing openings in a contoured portion or variation, or by variations in thickness of the wall, by variations in the juncture of a protuberance with wall and the horizontal section of the flange. One or more features may be varied to tune the fender to absorber energy of specific impact levels. The geometry may also depend upon space limitation or customer styling or higher or lower package space available.

Figure 3:
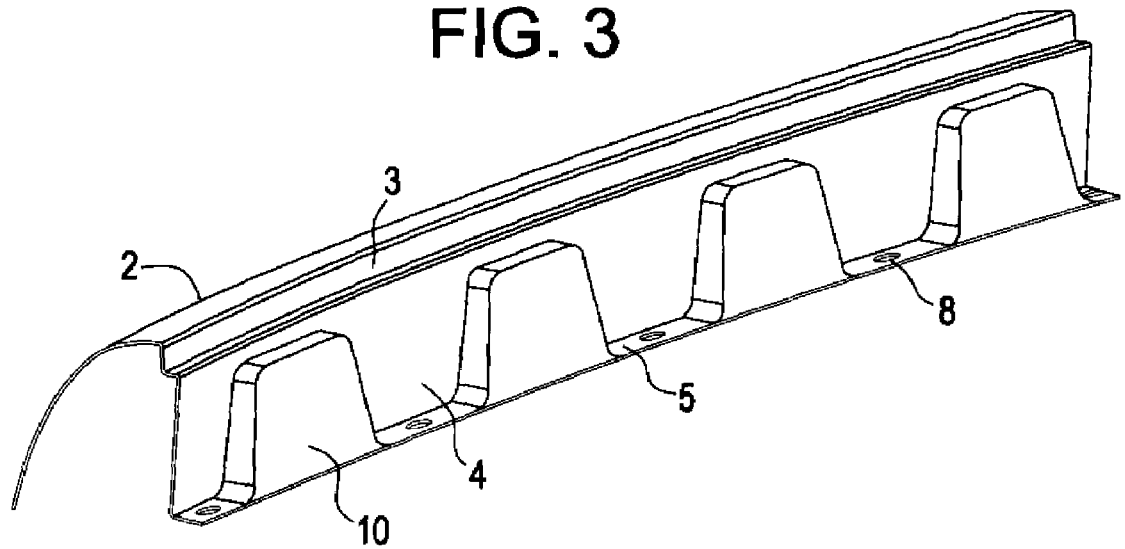
FIG. 3 is a partial perspective view of one embodiment of the vertically aligned section of the attachment flange.
Figure 4:
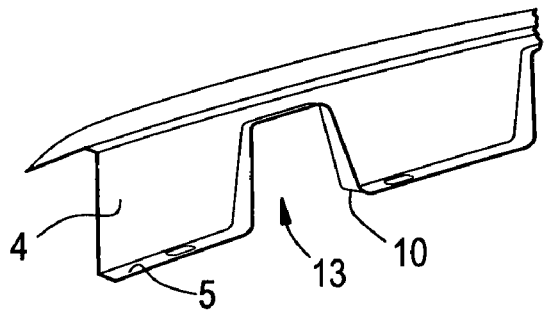
FIG. 4 is a partial perspective view of one embodiment of the vertically aligned section of the attachment flange.
Figure 5:
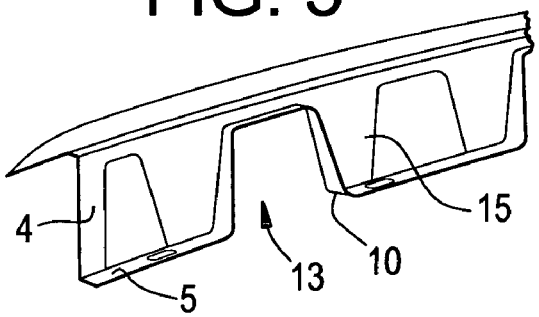
FIG. 5 is a partial perspective view of one embodiment of the vertically aligned section of the attachment flange.
Figure 6:
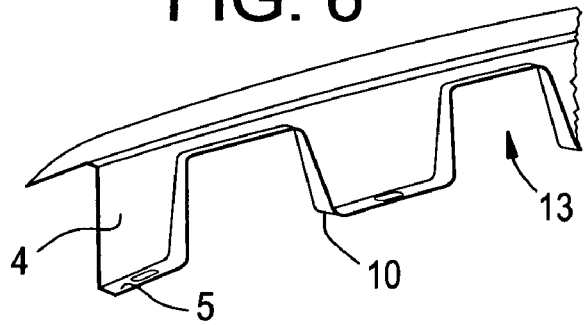
FIG. 6 is a partial perspective view of one embodiment of the vertically aligned section of the attachment flange.
Figure 7:
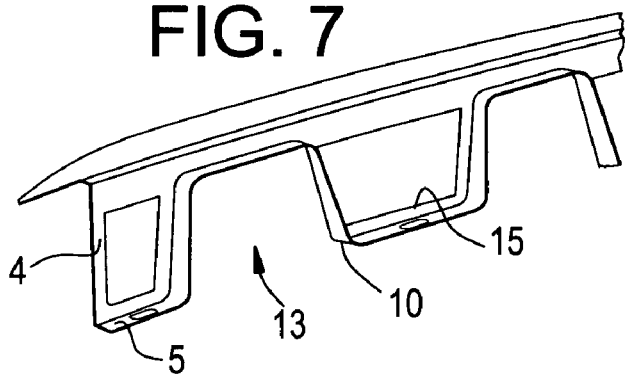
FIG. 7 is a partial perspective view of one embodiment of the vertically aligned section of the attachment flange.
Figure 8:
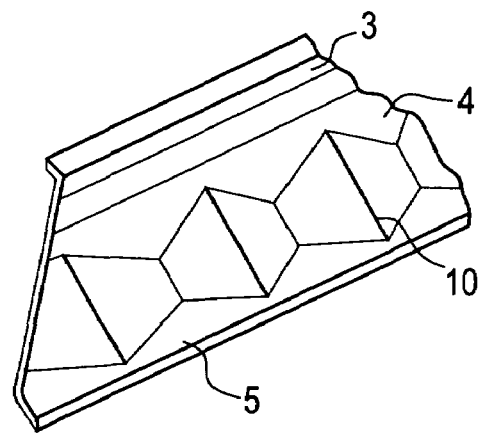
FIG. 8 is a partial perspective view of one embodiment of the vertically aligned section of the attachment flange.
Figure 9:
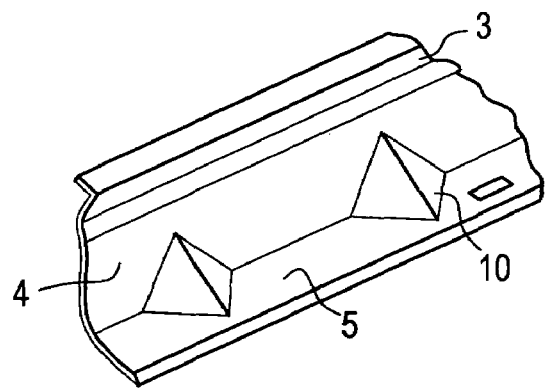
FIG. 9 is a partial perspective view of one embodiment of the vertically aligned section of the attachment flange.
Figure 10:
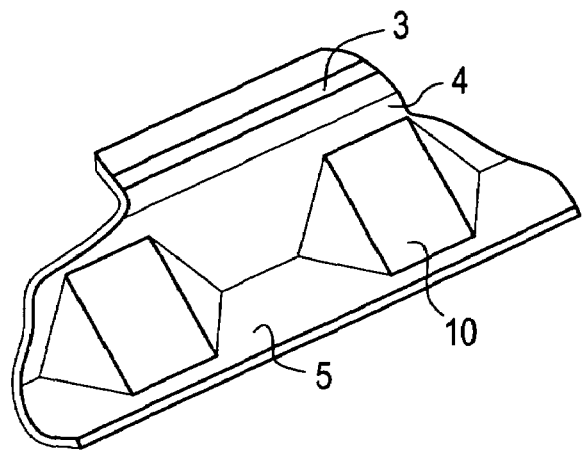
FIG. 10 is a partial perspective view of one embodiment of the vertically aligned section of the attachment flange.
Figure 11:
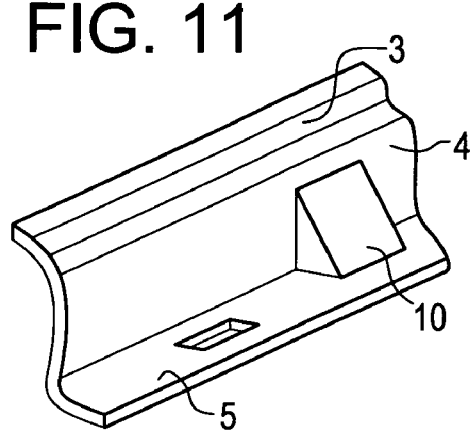
FIG. 11 is a partial perspective view of one embodiment of the vertically aligned section of the attachment flange.
Figure 12:
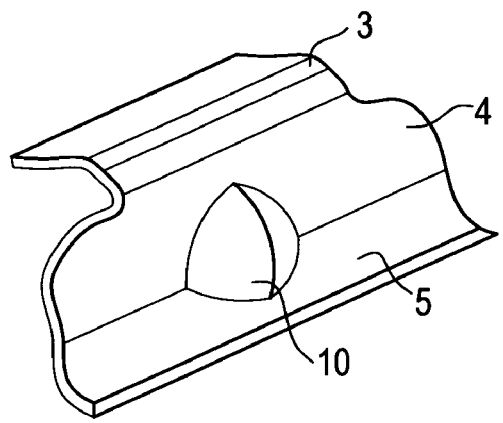
FIG. 12 is a partial perspective view of one embodiment of the vertically aligned section of the attachment flange.
Figure 13:
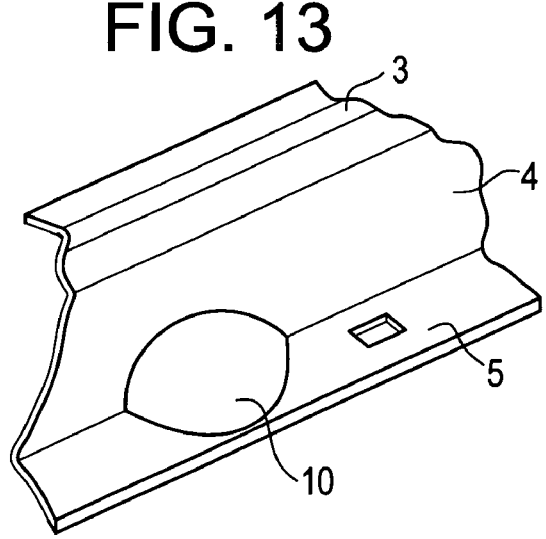
FIG. 13 is a partial perspective view of one embodiment of the vertically aligned section of the attachment flange.
Figure 14:
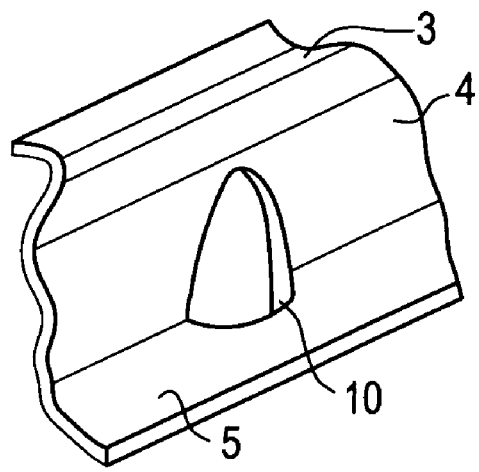
FIG. 14 is a partial perspective view of one embodiment of the vertically aligned section of the attachment flange.
Figure 15:
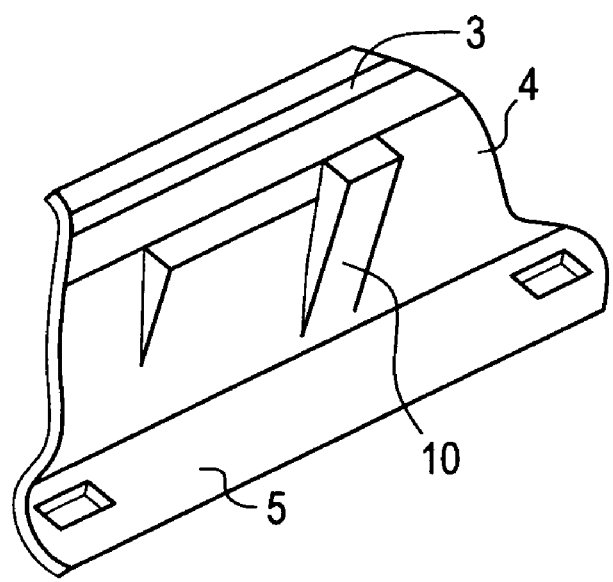
FIG. 15 is a partial perspective view of one embodiment of the vertically aligned section of the attachment flange.

As shown in FIG. 3, the contoured portions 10 are in the form of multi-sided projections having a pair of side walls and a top wall which join a front wall portion spaced from the vertical wall of the vertically aligned section 4 of the flange. FIG. 4 illustrates an embodiment of FIG. 3 where a contoured portion 10 includes an opening or cutout 13. FIG. 5 illustrates an embodiment of FIG. 4 where openings 15 are provided in the vertically aligned section 4 of the flange in addition to the opening 13 in the contoured portion 10. FIG. 6 illustrates a vertically aligned section 4 of the flange having an evenly spaced arrangement of contoured portions 10 with each contoured portion 10 having an opening 13. FIG. 7 illustrates an embodiment utilizing openings 13 in the contoured portion 10 and in the vertical section of the flange 4 having different shapes. FIG. 8 illustrates a contoured portion 10 having two joining planar surfaces extending between the respective vertical and horizontal sections, 4 and 5, of the flange. The joining surfaces from a hexagonal shape at the junctures with the flange with two junctures being with the vertically aligned section 4 and two junctures being with the horizontally aligned section 5 of the flange. In the configuration shown, respective adjacent contours 10 also form a juncture. FIG. 9 illustrates a contour section 10 having a pair of intersecting planes which form a triangular shape at the intersection of the respective vertically and horizontally aligned sections, 4 and 5. FIG. 10 illustrates a modification of the contoured section of FIG. 9 where a sloping planar section is positioned intermediate the pair of intersecting planes. FIG. 11 illustrates an embodiment of FIG. 10 where various sloping planes are utilized to form the contoured portion 10. FIG. 11, 12, 13, and 15 illustrate contoured portions 10 utilizing shaped surfaces. Such shaped surfaces may include oval, parabolic or other curved shapes, which may be either symmetrical or unsymmetrical.

While it will be apparent that the preferred embodiments of this invention as disclosed are well calculated to fulfill the objects stated, it will be appreciated that the invention is susceptible to modifications, variations, and changes without departing from the spirit and scope of the present invention being limited only in terms of the appended claims.

The invention claimed is:

1. A fender of the type being adapted to mate with a hood wherein said fender includes an exteriorly facing portion having an aesthetic exterior surface, and recess portion extending away from the aesthetic exterior for the seating of said hood when said hood is in a closed position, said fender being adapted for attachment to a vehicle for absorbing forces generated from an impact, said fender comprising an attachment flange depending from said recess portion wherein said fender and said attachment flange comprise a single integral unit of molded thermoplastic materials, said attachment flange comprising a vertically aligned section and a horizontally aligned section depending from said vertically aligned section and being joined at a juncture, said horizontally aligned section being adapted for mounting to said vehicle, said vertically aligned section including a plurality of contoured portions to provide for stiffening and resist forces in a lateral direction to said vertically aligned section.

2. A fender according to claim 1 being adapted to be mounted to a vehicle support member wherein said horizontally aligned section of said flange is adapted to be secured to a matching horizontally aligned surface of said support member.

3. A fender according to claim 1 wherein said fender consist substantially entirely of a plastic material.

4. A fender according to claim 1 wherein said fender consist substantially entirely of a thermoplastic material.

5. A fender according to claim 1 wherein said fender consist substantially entirely of a plastic material selected from the group consisting of a polycarbonate, copolyester carbonate, polyphenylene ether, polyurethane, polyethylene, polypropylene.

6. A fender according to claim 1 wherein said fender consist substantially entirely of a blend of a plastic material selected from the group consisting of a polycarbonate/polybutylene terephthalate blend, polyphenylene ether/high impact polystyrene blend, polycarbonate/acryconitrile-butadiene-styrene blend, and blends thereof.

7. A fender according to claim 1 comprising wherein the vertically aligned section of said attachment flange is adapted to crush upon a predetermined impact and provides dimensional stability for the said fender during normal use.

8. A fender according to claim 1 comprising wherein said contoured portion merges with said vertically aligned section and said horizontally aligned flange section to provide stiffening.

9. A fender according to claim 8 wherein the vertical height of the vertically aligned section of the flange equal to or greater than about 60 millimeters.

10. A fender according to claim 9 wherein the height of said vertically aligned section is from about 60 to about 100 millimeters.

11. A fender according to claim 1 wherein at least a portion of the contoured portion extends over about two-thirds of the height of the vertically aligned section of the flange.

12. A fender according to claim 1 wherein said contoured portion extends upwardly from the horizontally aligned section of said flange.

* * * * *